W. J. Lewis.
Making Chains.
Nº 19,094.  Patented Jan. 12, 1858.
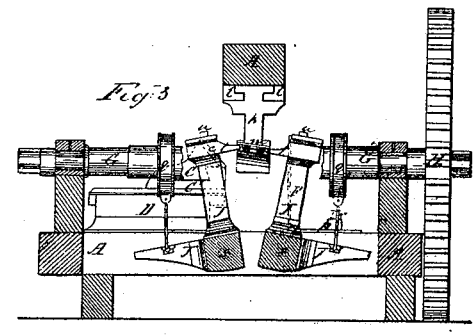
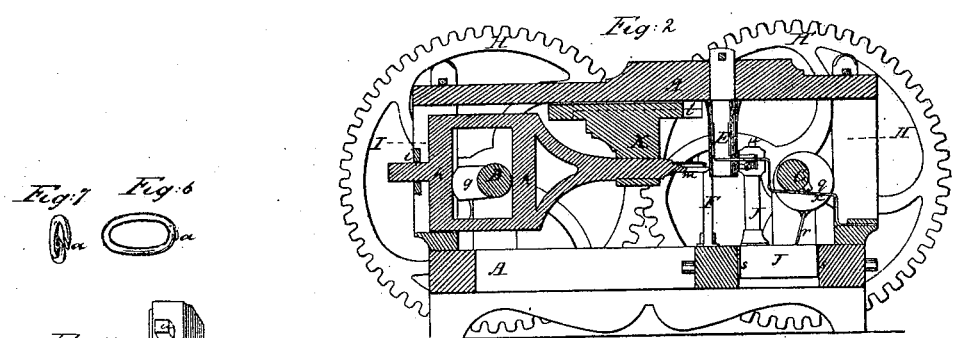
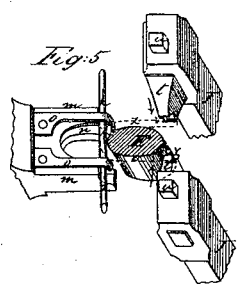
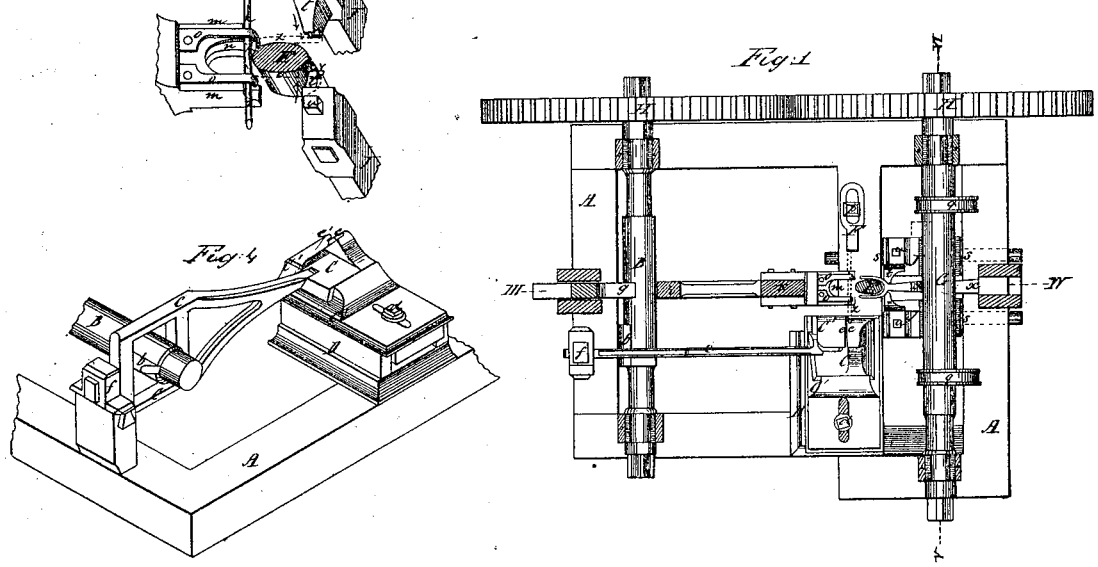
THE GRAPHIC CO. PHOTO-LITH. 39 & 41 PARK PLACE, N.Y.

UNITED STATES PATENT OFFICE.

WM. J. LEWIS, OF PITTSBURGH, PENNSYLVANIA.

CHAIN-MAKING MACHINE.

Specification of Letters Patent No. 19,094, dated January 12, 1858.

*To all whom it may concern:*

Be it known that I, WILLIAM J. LEWIS, of Pittsburgh, in the county of Allegheny and State of Pennsylvania, have invented a new and useful Improvement in Machines for Making Chains; and I hereby declare that the following is a full, clear, and exact description of the construction and operation of the same, reference being had to the annexed drawings, making a part of this specification, in which—

Figure 1 is a ground plan, (the upper part of the frame work being cut away, as indicated by the line of section I—II, Fig. 2); Fig. 2 is a longitudinal section of the machine, through the line III—IV of Fig. 1; and Fig. 3 is a transverse section through the line V—VI (Fig. 1); Figs. 4 and 5 are perspective views of parts of the machine which will be described hereafter.

The machine represented herein, is designed to form chain links out of a bar of iron; Figs. 6 and 7 are views of one of the said links, which are open, so as to allow to introduce one link into the other; and "scarfed" or beveled off and overlapping at the ends (as shown at $a$ $a$ (Figs. 6 and 7) so as to be ready for welding. The joining of the links together and the welding of them is done by hand or otherwise, and does not form a part of my invention.

In all the figures the same letters of reference indicate like parts.

A, A is the framework of the machine; B, a shaft connected with the steam engine or other motive power.

$b$ is a cam on the shaft B, operating on a yoke C, upon which connects with the sliding part C, of a pair of shears; C' being the stationary part of the shears. The shears C, C', rest on their seat D in such a manner, that their position can be changed forward or backward; $d$, is a setscrew, by which the shears are kept in any desired position, the blades $e$ $e'$ of the shears are inclined, (as shown in Fig. 4 and indicated in dotted lines in Fig. 3) the purpose of which, will be set forth hereafter; the guiding block $f$ of the yoke $c$ is also made to be adjustable, so that the yoke can be kept in a parallel position, when the position of the shears is changed, and for the same purpose the cam $b$ is made sufficiently long, to admit of shifting the yoke. $g$ is another cam on the shaft B, operating on a yoke $h$, which is guided at the back end by a transverse piece $i$ and in front by the head $k$, fastened firmly to it, and sliding in the guides $l$, $l$, on the frame A. The yoke $h$ terminates at its front end in a forked piece $m$ (shown in the Figs. 1, 2 and 3 and in an enlarged scale in Fig. 5);—$n$ is a groove in the fork; $o$, $o$, two springs, fastened on the same.

E is a mandrel fastened firmly to the framework A; F a gage, which is adjustable by means of a setscrew $p$.—G is another shaft, to which motion is communicated from the shaft B, by means of the cogwheels H, H'; $q$, $q$, are two eccentrics on the shaft G; J, J, two levers, vibrating on fulcrums $s$ $s$, and which are connected by the links $r$, $r$, with the eccentrics $q$, $q$.

$t$, $t$, are dies firmly fastened, to the heads of the levers J, J, by the setscrews $u$, $u$; the faces of the dies are notched, as shown at $v$, $v$, (Fig. 5); $w$ is a small cam, operating on a spring $x$, which at its end is fork-shaped, so as to extend around both sides of the mandrel E.

The operation of the machine is as follows: The bar of iron, out of which the chain links are to be formed, is fed in between the shears, passing through at the ends of the fork $m$, under the springs $o$ $o$ (which are hooked at their ends, as shown in Fig. 5) until it comes into contact with the gage F. The machine being set in operation, the shears C, C', will cut off that piece ($z$, $z$) of the bar, which is between the shears and the gage; a piece $z$ $z$ of this kind is shown in Fig. 5, and indicated by dotted lines in Fig. 1. The length of this piece must be sufficient to form a chain link. Immediately after the cutting off of the said piece $z$, $z$, the fork $m$ is pushed forward, by by the action of the cam $g$ on the yoke $k$, and will thereby bend the piece $z$, $z$, around the two sides of the mandrel E, as indicated by dotted lines in Fig. 5. At the forward motion of the fork $m$ and as the piece $z$ $z$ is bending around the mandrel it will enter into the groove, $n$, inside of the fork $m$, whereby it is kept, in a certain position during the process of bending; the springs $o$, $o$, will loose their hold on the piece $z$ $z$, as it is bending, so that the fork, when moving back again, will leave the piece, $z$, $z$, bent around the mandrel, as shown by dotted lines in Fig. 5. This process of partially bending the piece $z$, $z$, is immediately followed by the operation of the two levers J, J, whereby the bending of the link is completed; the heads of the levers J, J, move, by the action of the eccentrics, $g$, $g$, in contrary directions (as indicated by arrows in Figs. 5 and 3, when their dies $t$, $t$, will press against the ends of the piece $z$, $z$, and bend them completely around the mandrel E; the notches $v$, $v$, in the face of the dies preventing the ends from slipping off the dies during the process. It is to be observed now, that the fork $m$, with its groove $n$, has a somewhat inclined position as will be seen by reference to Fig. 3; this causes the ends of the piece, $z$, when bent around the mandrel by the said fork, to be out of a horizontal position in relation to each other, one of the ends, being a little higher than the other; the dies, $t$, $t$, of the levers J, J, are in corresponding positions respectively, so that their notched ends will be one above the other, and will overlap each other when arrived at the extreme end of their inward stroke or motion. By this arrangement, the ends of the link are brought, not close together, but a sufficient space is left between them, (as shown in the side view of a link Fig. 7); this is for the purpose of allowing the links to be connected into a chain. The ends of the links, as they are made by the machine, are also beveled, or "scarfed" so as to be properly prepared for welding. This "scarfing" is effected by the arrangement of the shears C, C', which, having an inclined position, will cut the bar of iron (which is fed in horizontally) obliquely or beveling. By giving the shears a more or less inclined position, the "scarf" may be made to be beveling to any desired degree. After the chain links are completely bent around the mandrel, they are discharged or removed from the mandrel, by means of the forked spring lever $x$; the same being pressed down by the action of the cam $w$, its forked end will act on the said link, and strip the same off the mandrel. All these different operations as described, to wit: the cutting off by the shears, partial bending by the fork $m$, and complemental bending by the dies $t$, $t$, and finally the discharging of the links by the lever $x$;—are done in quick succession, and the position of the cams and eccentrics on the shafts, and their arrangement, must be, of course, strictly regulated and made in relation to each other, to operate as described.

By the same machine, chain links of different sizes and strengths may be made; as the mandrel is made to allow of its being taken out, and to be exchanged for another one of any desired size. A different sized mandrel requires however more or less length of iron, to form the corresponding size of link, and the positions of the gage F and shears have therefore to be regulated (by means of their set screws $p$ and $d$) to produce the required length.

Having thus fully described my invention, what I claim herein as new and desire to secure by Letters Patent, is:

The arrangement of the fork ($m$) with its groove ($n$) and springs ($o$, $o$), the levers ($j$, $j$), with their notched dies ($t$, $t$) and the forked spring lever ($x$), when operating in relation to each other and to the mandrel E, substantially as herein described; whereby the bar composing the link is presented in an inclined position to the mandrel E, and closed or bent around the same spirally, and then discharged.

WM. J. LEWIS.

Witnesses:
  HENRY MOSER,
  AND. MCMASTER.